United States Patent Office 3,499,533
Patented Mar. 10, 1970

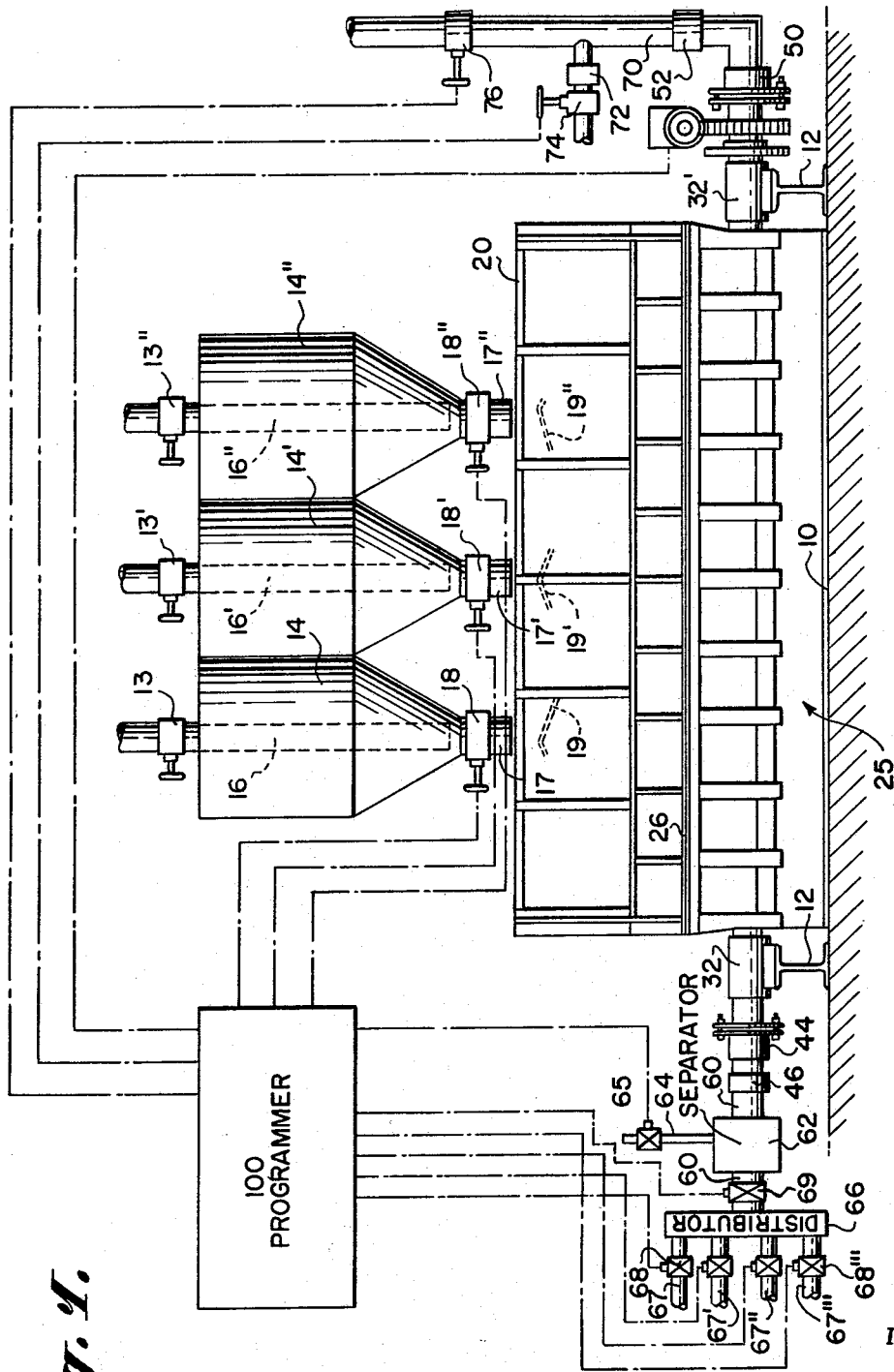

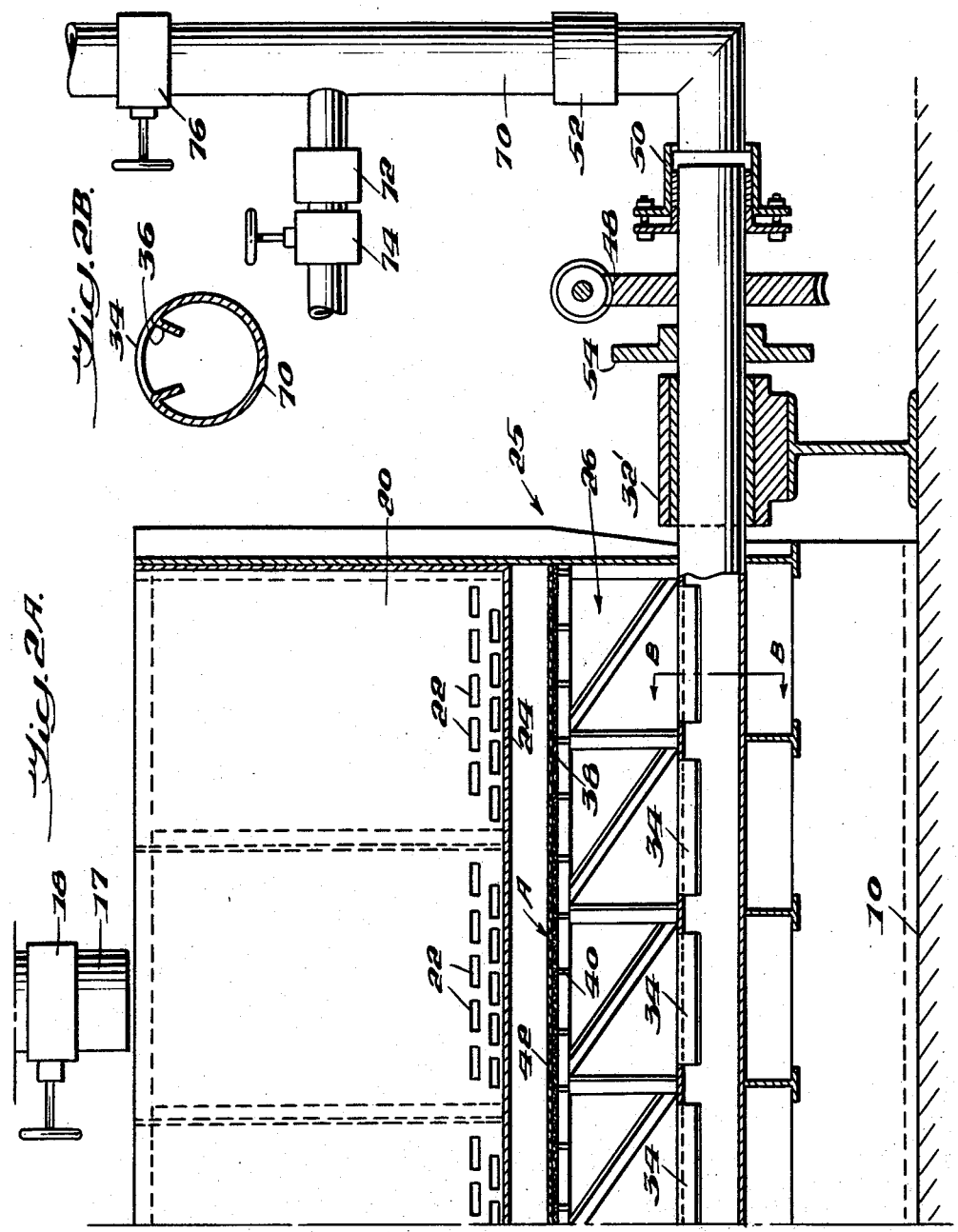

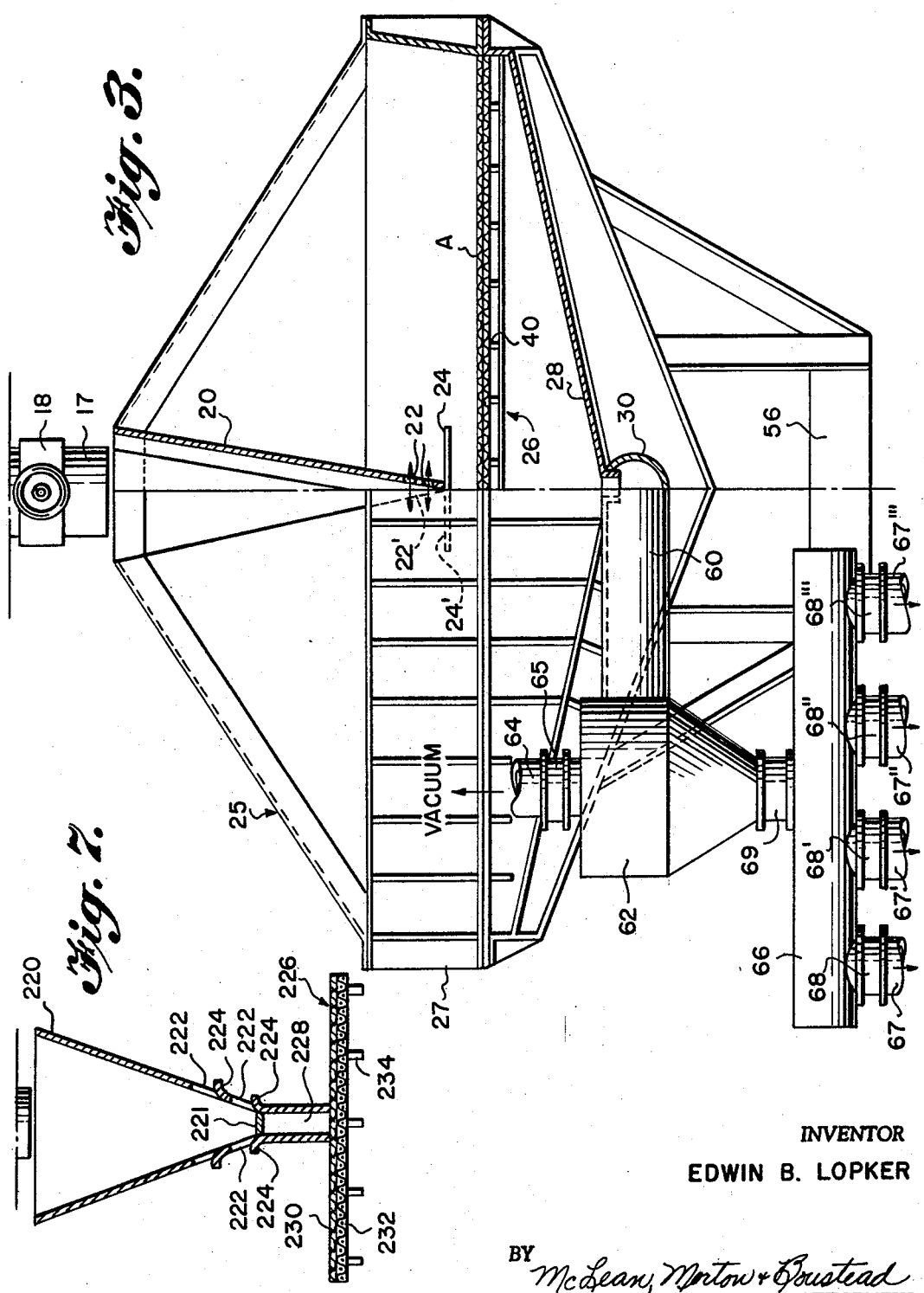

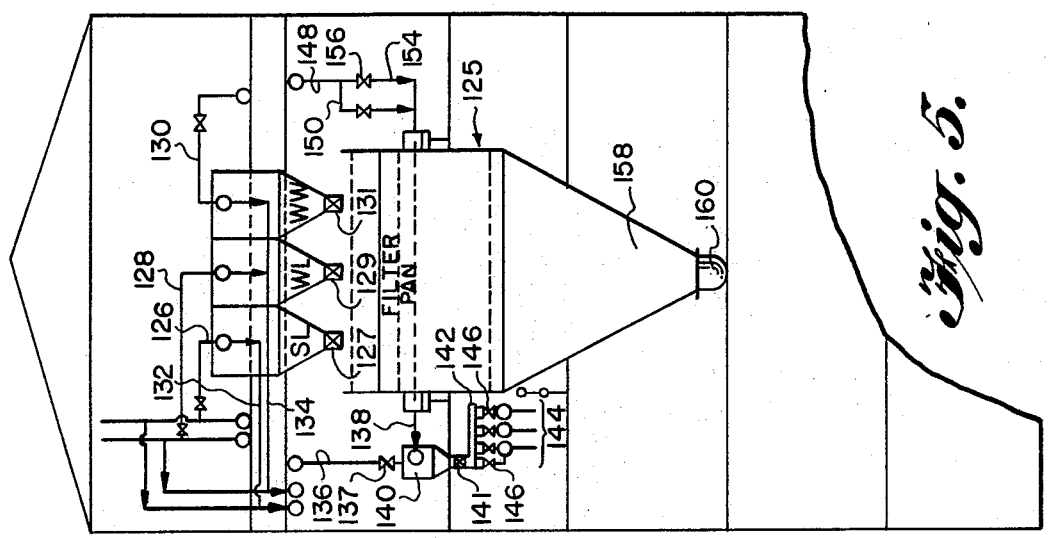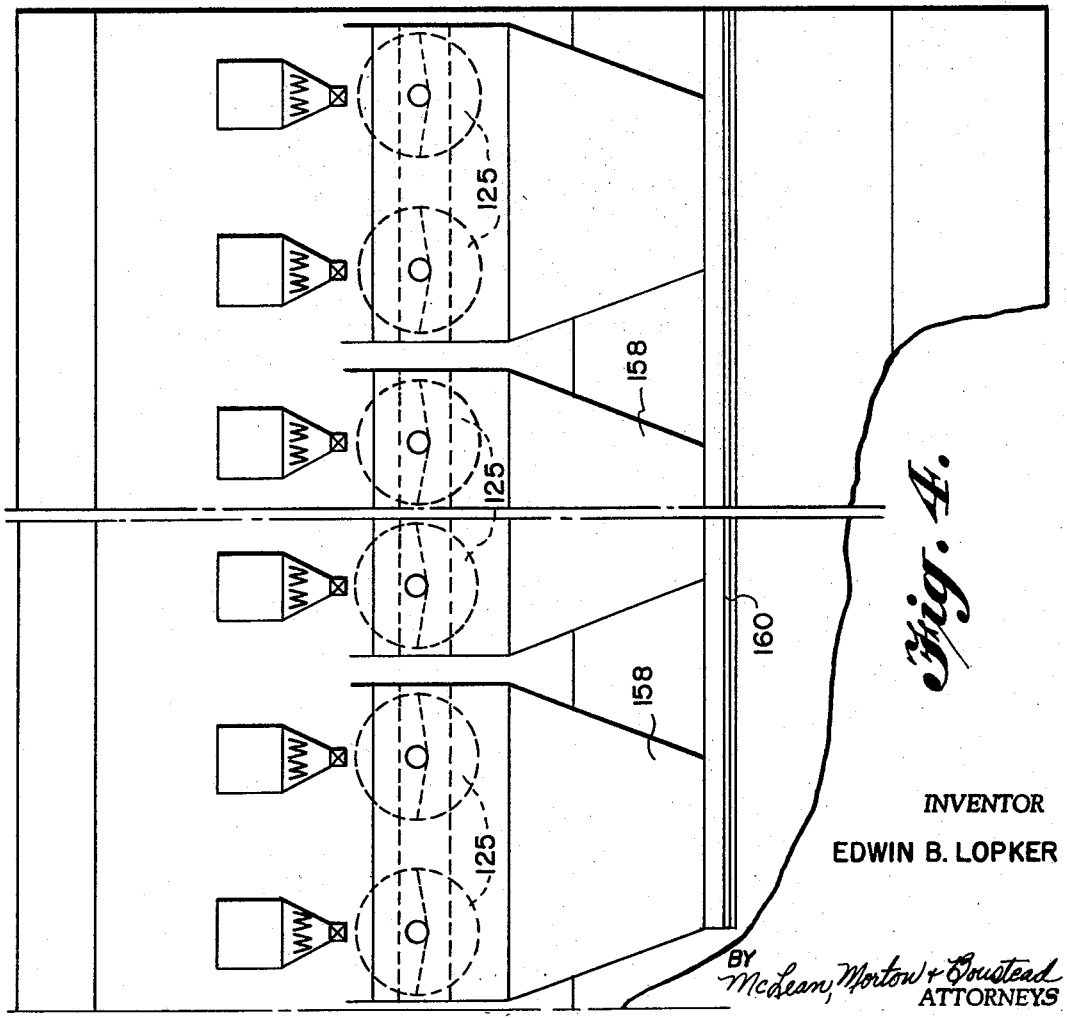

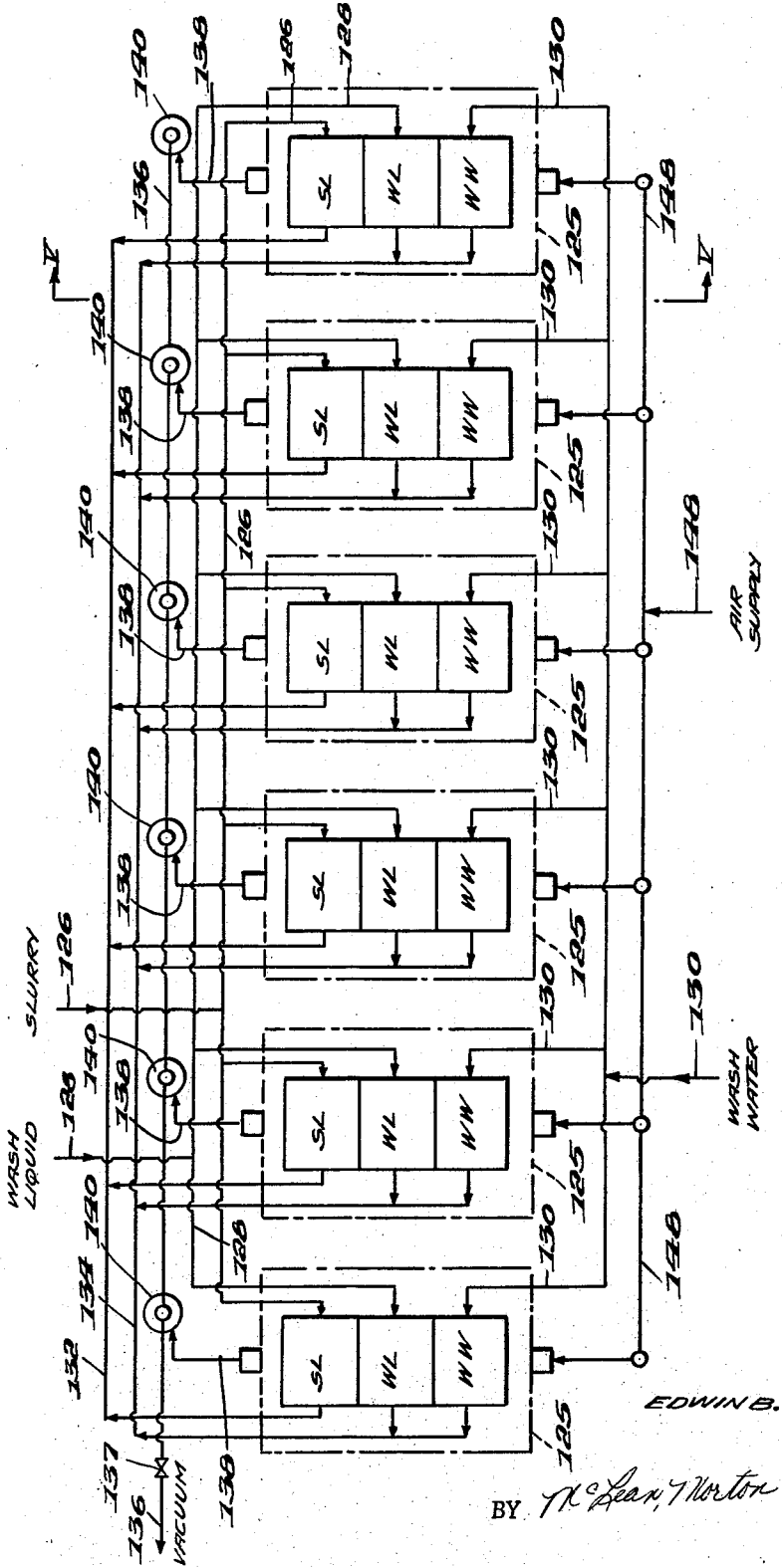

3,499,533
AUTOMATICALLY CLEANED, PIVOTABLE,
FILTER ASSEMBLY
Edwin B. Lopker, Fort Lauderdale, Fla., assignor to American National Bank and Trust Company, Fort Lauderdale, Fla., trustee
Continuation-in-part of application Ser. No. 515,636, Dec. 22, 1965. This application Nov. 19, 1968, Ser. No. 812,495
Int. Cl. B01d 33/38, 33/36, 33/00
U.S. Cl. 210—140
10 Claims

ABSTRACT OF THE DISCLOSURE

A horizontal vacuum pan filter in which the filter cake is not transported from feed point to wash point to cake discharge points as is commonly done. The feed of slurry, wash liquids, etc., is continuous to the filter system but they are charged to the filter surface intermittently in a predetermined sequence. Discharge of the filter cake is by inversion of the horizontal filter pan. The basic filter system consists of three fundamental units; surge boxes with their associated feed and charge valves; a horizontal filter pan with its distribution trough, inversion, i.e. tilting, drive, filtrate and air valves, etc., and an automatic adjustable timing programmer. The normal accessories of feed and washer liquor pumps, scrubbers and condensers, vacuum sources, filtrate pumps, air sources, cake handling equipment, etc., are similar to those usually provided for vacuum filters.

---

This application is a continuation-in-part application of my copending application, Ser. No. 515,636, filed Dec. 22, 1965, now abandoned.

This invention relates to new and useful improvements in filtration and to a filtration system using filters of the tilting cell type. More particularly, this invention relates to a filtration system including a tilting cell filter wherein vacuum is applied to provide a pressure differential across the filter to force the filtrate through the filter and wherein the filter cake is washed one or more times with the filtrates and filter cake being separately removed.

Commercial apparatus available to carry out vacuum filtrations are, in effect, adaptations on a larger scale of the simple filter funnel used in the laboratory to separate liquids from solids by vacuum. Many of the apparatus designs used commercially may readily be considered as comprising units similar to the familiar "Buchner" filter funnel of the laboratory, but so arranged geometrically and mechanically as to effect an automated batch operation. This operation frequently includes, after the bulk of the liquid has been separated, washing out of the occluded liquor in the solids together with the means to separate the filtrates so that an approximation of countercurrent displacement of liquid from solid is achieved. Either the liquid, the solid, or both liquid and solid may be the product desired but, in any event, the normal objective is to accomplish an efficient separation of liquid and solid with minimum amounts of solids in the liquid filtrate and minimum amounts of liquid retained in the solids. When washing is resorted to, for example, in order to displace liquid solutions from the filtered solids, it is usually important that the liquid used for such washing be efficiently utilized so as to effect the maximum displacement of the primary liquid with the minimum quantity of wash liquid.

Commercial vacuum filters of the continuous (or more properly, automated batch) type of operation may be divided into certain basic categories. In one category the axis of rotation of the filter is horizontal. Familiar examples are the rotary drum type, commonly called Oliver filters with the filtration surface comprising the external surface of the cylinder, divided into a number of sections by barriers which are parallel to the axis of rotation. An adaptation of this type places the filtration surface on the internal cylindrical area of the drum again with the filtration surface divided into a number of sections by barriers parallel to the axis of rotation. A second category of vacuum filters is comprised of those designs in which the axis of rotation is vertical, the filter surface being horizontal. One of these designs, which has been widely applied commercially to the separation of gypsum solids from phosphoric acid produced by the "wet process" (i.e. from the reaction of phosphate rock with sulfuric acid) is the "Prayon" filter described in U.S. Patent 2,684,158. In this design the horizontal radial sections consist of individual pans carried by a circular supporting mechanism which rotates horizontally. Each pan is connected to the central rotary valve and, to remove the solids after the filtration and washing operation is complete, a system of lever cams and guide rolls inverts each, separaetly supported pan as it comes to the cake discharge position. In both of the designs just described, a central rotary valve is arranged to approximately separate filtrate and wash liquids. A third category of vacuum filters comprises the "belt" filters. In these designs an endless horizontal perforated belt, covered by the filter media, passes over a vacuum box. The vacuum box is usually divided into several compartments in order to roughly separate primary filtrate and wash liquids.

It is to be noted that in these known filters, the application of feed slurry to the filter surface is essentially continuous as is the application of wash liquids. The filter surface, and the solids upon it, are transported from the point of slurry application to points of wash liquids application and finally the point of cake discharge. The relationship of the filtrate parts in the central rotary valve are dependent upon the angular or radial position of the filter sections except in the case of a belt filter. In this case the relationship is linear but, during the operation, remains fixed in relation to belt travel. In all of the types, speed of rotation (or speed of belt travel for the belt filter) is used to compensate for variations in rate of filtration, washing, etc., and, since the designs operate as integrated mechanical units, the slowest of the operations governs the capacity.

It is the purpose of this invention to provide a vacuum filtration apparatus in which all of the operations are separately controllable and, in addition, to provide a simple, low cost apparatus which can accomplish certain advantageous operations which cannot be provided by existing designs. In this invention the filter media and separated solids are not transported from a slurry application point to wash liquids application points to filter cake discharge points to filter media wash points, etc. Further, the time allowed for each operation in the filtration cycle is separately and individually adjustable and, still further, the operation of the filtrate valves for separation of primary filtrate from wash liquids, for admission of air, etc., is independently adjustable with respect to time and not dependent on the angular, radial or linear position of the filter media. With this invention it is possible not only to make very sharp "cuts" between all liquid effluents such as primary filtrate, various wash liquids, etc., but it is also possible to easily adjust, while operating, the timing of such "cuts" to match them exactly to the variables in the rates of separation on the filter. In this invention the addition of slurry, wash liquids, etc., is continuous to the filtration apparatus but is step-wise to the filter media surface.

In general, this invention consists of a horizontal vacuum pan filter in which the filter cake is not transported from feed point to wash point to cake discharge point as is now commonly done by presently known designs. The feed of slurry, wash liquids, etc., is continuous to the filter system but they are charged to the filter surface intermittently in a predetermined sequence. Discharge of the filter cake is by inversion of the horizontal filter pan. The basic filter system consists of three fundamental units; surge boxes with their associated feed and charge valves; a horizontal filter pan with its distribution trough, inversion, i.e. tilting, drive, filtrate and air valves, etc., and an automatic adjustable timing programmer. The normal accessories of feed and wash liquor pumps, scrubbers and condensers, vacuum sources, filtrate pumps, air sources, cake handling equipment, etc., may be similar to those usually provided for vacuum filters.

Further objects and advantages of this invention will become apparent from the detailed description hereinbelow and the attached drawings wherein:

FIGURE 1 is a side elevational view of the filter system of this invention with the operative connections to the timing programmer schematically shown and support beams removed for clarity;

FIGURE 2A is a sectional view of the right end of FIGURE 1 and FIGURE 2B is a sectional view taken along line B—B in FIGURE 2A;

FIGURE 3 is an end view of the apparatus of FIGURE 1;

FIGURE 4 is a side view schematically illustrating a system incorporating a plurality of units as illustrated in FIGURES 1 and 3;

FIGURE 5 is an end view of the system schematically shown in FIGURE 4 illustrating the piping and taken along line V—V in FIGURE 6;

FIGURE 6 is a top plan view of the system schematically illustrated in FIGURE 4 illustrating the arrangement of surge boxes and piping; and FIGURE 7 illustrates a modified distributor trough for the filter surface.

Referring now to FIGURES 1 and 3, the filter unit of this invention includes a base or foundation 10 and a tilting pan filter cell, generally designated as 25, supported on foundation 10 by support elements 12. A number of surge boxes 14, 14', 14'' are supported above filter cell 25 by means not shown and contain feed slurry and various wash liquids and water. The surge boxes receive feed slurry and wash liquids through feed lines 16, 16', 16'' and intermittently discharge them in a predetermined sequence through a distributor trough 20 to the surface of filter cell 25. Each surge box is preferably provided with an overflow and transparent sight tube (not shown) so that excessive feed flow can readily be observed. The proportions of the surge boxes may be selected so as to prevent segregation or to encourage it, as may be desired. In normal practice, the feed material is continuously delivered to the bottom of the surge boxes via feed lines 16, 16', 16'', respectively, in order to avoid undue segregation. Feed valves 13, 13', 13'' control the supply of feed slurry and wash liquids to surge boxes 14, 14', 14''. The feed valves are manually adjusted to provide an adequate supply of these materials to the filter unit and the flow of these materials is continuous and at the average rate handled by the filter unit. An air lift may be used in the surge boxes to provide mixing if necessary or desirable. The retention time in the surge box is normally so short that this is unnecessary.

Discharge from surge boxes 14, 14', 14'' is controlled by high capacity dump valves 18, 18', 18'' in discharge lines 17, 17', 17'', respectively, which are operated automatically and intermittently to discharge the contents of surge boxes 14, 14', 14'' over distributor plates 19, 19', 19'' to distributor trough 20. Normal timing is such that each surge box empties each time its charge valve is opened and the charge valve closes shortly thereafter on the average feed stream coming through the feed valve, providing the effect of a "dribble" shutoff. Distributor trough 20 receives the feed slurry via charge valve 18 (or wash liquid) and distributes it to the surface of the filter pan, generally designated as 26, or cake surface in the case of wash liquids, of cell 25. Distributor trough 20 runs empty immediately following the closing of charge valve 18. It retains no material serving only to distribute the material. Distributor trough 20 is V-shaped with closed ends and has slotted openings 22 at the bottom or apex of the V. Trough 20 extends the full length of filter cell 25 along the longitudinal center plane thereof and is essentially integral with the upper sides of cell 25. Trough 20 is provided with two hinged deflector flaps 24 and 24' one on etiher side of the apex. Flaps 24 and 24' are in a horizontal position during all operations except filter cake dumping. In the horizontal position flaps 24 and 24' prevent direct impingement of feed slurry, or wash liquids, upon pan 26 during charging periods and serve to spread out the slurry. When cell 25 is inverted to discharge the filter cake flaps 24 and 24' drop back by gravity over the slotted openings 22 preventing any cake from entering these openings and presenting a sharp V so that no interference with cake discharge can occur.

FIGURE 7 illustrates a modification of the distributor trough. In this modification, the pivoted flaps 24 and 24' are replaced by a series of louvers 224 produced, for example, in punching out openings 222 in distributor trough 220. Since louvers 224 are stationary, trough 220 is secured to the filter bed 226 by a dummy section 228. The filter bed can include filter cloth 230 and screen 232 supported on a grid of bars 234. Filter cloth 230 is secured along its center line by section 228. The apex or bottom 221 of the distributor trough 220 should be level with the lower openings 222 to insure complete emptying of the trough.

The filter cell 25 includes filter pan 26 which has a generally horizontal filter surface A although the bottom 28 (see FIGURE 2A) of the pan is pitched from each side of cell 25 to the longitudinal center plane where a large longitudinal collector pipe 30 is arranged. Pipe 30 extends through trunnion bearings 32, 32' at the ends of filter cell 25 which support cell 25 and form the center about which the cell 25 rotates to discharge the cake. Slotted opening 34 which have skirts 36 (see FIGURE 2B) are provided in the collection pipe 30. Skirts 36 insure that if a small amount of liquid remains in pipe 30 when cell 25 is inverted, it cannot run back into filter pan 26. The horizontal filter surface A of filter pan 26 is formed by a screen 38 suitably supported on a grid 40 of bars and the screen 38 in turn is covered by a filter cloth 42. Both screen 38 and filter cloth 42 are clamped into place with gaskets (not shown) between the flanges around both sides and ends of filter pan 26 and the corresponding flanges of the pan shroud or upper section 27 of the pan assembly. Outboard of trunnion 32 on one end is a simple packed joint 44 which permits rotation of filter cell 25 to discharge the cake. A short hose connection 46 connects collector pipe 30 to a filtrate removal pipe 60 and eliminates the need for accurate alignment. All filtrates pass out of this end of collector pipe 30 to the filtrate header.

The end of the collector pipe 30 outboard of trunnion bearing 32' at the other end of filter cell 25 is provided with a worm gear drive 48 to invert the cell 25 and discharge the filter cake on pan 26. Outboard of the worm drive is a packing gland 50 similar to the one on the filtrate end of collector pipe 30. A short hose connection 52 eliminates alignment problems. Mounted on collector pipe 30 adjacent worm gear 48 is a cam disc 54 which stops the filter accurately in an upright horizontal plane after discharging the cake. The programmer, discussed in detail later, initiates cell rotation to discharge the cake but rotation is stopped by a switch (not shown) operated by cam disc 54 in order to insure accurate level.

The cell 25 is counterweighted. The counterweight 56 (see FIGURE 3) is somewhat heavier radially than the dead weight of cell 25 but less than the cell plus filter cake. Then when cell 25 starts to invert the excess weight of cake assists rotation as soon as the unit moves off top center. When bottom center is reached, the cake is discharged and then the excess of counterweight 56 over cell dead weight assists in continuing rotation to an upright position. The drive acts more as a speed controller than as a source of power, providing a smooth inversion via worm drive 48. During inversion or tilting of cell 25, preferably the cell performs one complete revolution.

The filtrate removal pipe 60 is connected to a separator 62 and a vacuum is applied to separator 62 through vacuum pipe 64 and vacuum control valve 65 to draw filtrate through collector pipe 30 and filtrate removal pipe 60 into separator 62. The liquid, i.e. the various filtrates such as weak wash, strong wash, clean filtrate, etc., are separated and removed from separator 62 by pump 69 through filtrate header 66 from which they enter into their respective discharge lines 67, 67′, 67″ and 67‴. In some instances it is possible to equip each discharge line 67, 67′, 67″ and 67‴ with its own pump located downstream of the filtrate header 66. However, the use of the single pump 69 located intermediate the separator 62 and the filtrate header 66 is preferred. In this preferred arrangement, only one pump is needed to handle all of the filtrate, saving on equipment costs. There is a sufficiently low elevation so that the pump gets adequate suction. In those cases where scaling is a problem, this arrangement keeps the pump clean since the successive fluids passing through the pump during a filtration cycle are each more pure and, accordingly, the pump is washed clean. The filtrate valves 68, 68′, 68″, and 68‴ arranged at filtrate header 66 in the respective discharge lines are automatically opened and closed during the various stages of an operating cycle as discussed hereinbelow so as to accurately separate cloudy and clear filtrates and the various wash liquids. The time when the valves open and the length of time that they remain open is independently adjustable at the programmer as also discussed hereinbelow and, as the filtrate valves are entirely independent of any mechanical relationship with filter cell 25 very sharp cuts between the liquids can be consistently made.

Since it is desirable that air also be supplied to the filter cell 25 at various times, an air supply pipe 70 is connected to collection pipe 30 at hose section 52. Air is bled into pipe 70 through an air bleed valve 72. Valve 72 serves an important function in the operation of filter cell 25. It provides a source of a limited amount of air during periods of the filter cycle when filter pan 26 is flooded and no air can reach the interior of the filter via the cake. It is at these times that the liquid being handled by collector pipe 30 and filtrate header 66 is at maximum, and the introduction of a limited amount of air assists in clearing this liquid from collection pipe 30 and filter cell 25. The quantity of air is limited by the setting of manually operated air bleed valve 72 and its application is controlled by the programmer, as discussed below, through operation of an automatic air bleed valve 72. Air blow valve 76 is operated automatically at such times and at such periods during the filter cycle as desired. For example, air blow normally will be used when filter cell 25 is in the inverted position to assist in dislodging the cake on filter cloth 42. It may also be used as a source of agitation in repulping solids in filter pan 26, washing filter cloth 42, treating solids on cloth, etc. The air blow may be heated, cooled, mixed with live steam, etc., if desired. It is important to note that the air enters collector pipe 30 at the end opposite filtrate discharge pipe 60. The effect is then to blow any remaining liquid in collector pipe 30 out into filtrate header 66, and not back into filter cell 25. Provision for pulsing the air blow may be made when desirable.

Programmer 100 is, as shown by the dashed lines in FIGURE 1, operatively connected to each automatically controlled valve including charge valves 18, 18′, and 18″, filtrate valves 68, 68′, 68″ and 68‴, filtrate pump 69, vacuum control valve 65, air blow valve 76 and air bleed valve 74 and to the worm gear drive 48 to control the inversion or rotation of the filter cell 25 and the filtration cycle. Although, in general, different types of programmers can be used for this operation, preferably programmer, generally designated as 100, is a single electronic timer in conjunction with a stepping switch. In such a programmer, the sequence of opening and closing the charge valves, filtrate valves, air valves, pan rotation, etc. is determined by the wiring sequence of the programmer stepping switch and can easily be changed to suit any requirements. Normally it is not changed after being established for a given filtration operation. The time intervals in all of the individual steps of the sequence are adjustable at all times during operation and the changing of the time interval on any one step does not affect the timing on any of the other steps in the sequence. The length of time for any one step is determined by the setting of a small potentiometer. There is a similar potentiometer for each step in the cycle. When a step is "timed out" by the electronic timer, the stepping switch resets the electronic timer and, in advancing to the new position, the stepping switch cuts in the next potentiometer and timing proceeds again, the potentiometer setting determining the new time interval. Other decks of contacts on the same stepping switch provide for the operation of valves, etc., according to the sequence desired. A non-adjustable minimum time may be provided for any of the steps (for example, pan inversion) by combination of a fixed resistor in series with the variable resistor. This procedure may also be used to provide very sharp time interval control. The programmer incorporates pilot lights to indicate the step in the sequence currently being timed. It will be apparent that any or all steps are adjustable at any time, even while a particular step is being timed. This flexibility provides many advantages over any presently known designs. The operation of the valves is rapid, normally about one second, and the speed of pan inversion is entirely independent of the filter unit cycle or speed. This flexibility allows vacuum to be cut off, if desired, during the time that slurry or wash liquid is charged and instantly reapplied. True displacement washing is simply attained. The time lag between the moment that a filtrate out passes through the cake and the time it appears at the filtrate valve can be accurately compensated. Any such adjustments may be made at any time as variables in slurry filtering or washing rates may indicate. In other words, every step in the filtration cycle may be minimized with respect to time, resulting in maximum capacity per unit of filter area. Since such programmers are well known, further details of the construction are believed unnecessary and only the sequence of steps will be further described.

One complete filtration cycle will now be described with reference to a typical industrial separation process, such as the separation of gypsum and phosphoric acid during the industrial production of that acid by the wet process. The cycle will be assumed to begin with the filter pan 26 horizontal and empty and supply valves 13, 13′ and 13″ open. The cycle is initiated by opening charge valve 18′ to dump a charge of, for example, gypsum sludge or slurry, including phosphoric acid, onto filter pan 26. The charge valves are high capacity, quick acting valves, such as butterfly valves, which rapidly dump the entire contents of surge box 14′ onto the filter pan 26. Distributor 20 and plates 24 and 24′ spread the charge over the filter cloth 42. Vacuum is then applied to provide a pressure differential across filter pan 26 by opening valve 65 with charge valve 18′, or shortly thereafter. Filtrate removal valve 67‴ opens shortly after vacuum is applied to pan 26 to permit removal of cloudy filtrate for recycle. The timing and sequence of opening valves 18′, 65 and 67‴ is controlled by programmer 100. As the filtrate clears, valve 67‴ is closed and valve 67″ opened for removal of clear filtrate. Slurry is continuously supplied to surge tank 14′ through pipe 16′ so that after a predetermined time, i.e. the time required for dumping a charge of slurry onto pan 26, valve 18′ is closed to allow refilling of surge tank 14′. Following removal of clear fitrate, wash liquid in surge box 14 is dumped through distributor 20 by opening and closing charge valve 18 and shortly thereafter, to allow complete removal of filtrate through the system, filtrate removal valve 68′ is opened to permit removal of strong wash liquid. Similarly, in turn, the wash water in surge box 14″ is dumped and removed from the filter pan 26 as weak wash through pipe 67 by control of charge valve 18″ and filtrate removal valve 68. Upon removal of weak wash, vacuum control valve 65 is closed and the filter cell 25 rotated by actuation of the worm gear drive 48 through the programmer 100. The upper sides 27 of filter pan 26 have a few degrees of flare to allow for free discharge of the cake. Excessive flare is to be avoided as edges of the cake will not then be properly washed or dewatered. Air can be injected through valve 76 at this time to loosen the filter cake on pan 26 and assist in removing the filter cake. Also, air can be injected through bleed valve 74 to assist with liquid removal, if desired, during the time the filtrate valves remain open.

It will be obvious that the filter provides for the minimum possible maintenance. The filter moves to invert only once each cycle. The filter cell 25 can handle crackink cakes by either of three methods: First, the flexibility of timing allows wash liquid to be added at the instant that excess liquid disappears from the cake and before shrinking can occur. Second, shrinking can be permitted to occur and then a small additional amount of feed slurry can be charged to the pan before washing. This fills the cracks and further cracking is not normally encountered since the bulk of the cake has already shrunk, and third, by repulping. There are some types of filter cakes, usually characterized by being thixotropic, that do not wash efficiently by normal application of wash liquids. These cakes may be repulped right in the filter pan with consequent saving of time and additional equipment. When dry discharge is desired, the cloth can be spray washed, while in the upright position after the cake has been discharged by means not shown utilizing air blow, etc. With wet discharge, the cake may be repulped in the pan if desired or, alternatively, dumped dry and cloth washing accomplished by sprays while the pan is in an inverted position. In certain cases the filter cloth may require periodic chemical treatment, as, for example, to remove certain types of blinding, etc. and this is readily accomplished after cake discharge when the filter returns to an upright position.

FIGURES 4, 5 and 6 illustrate a filter system incorporating a plurality of filter cells 125 each of which is constructed like filter cell 25 described above. Filter cells 125 have a common supply of slurry, wash liquid and wash water to their respective surge boxes including slurry surge boxes SL, wash liquid surge boxes WL, and wash water surge boxes WW, through lines 126, 128 and 130, respectively. Surge boxes SL, WL and WW are emptied through charge valves 127, 129 and 131, respectively. Overflow lines 132 and 134 are provided for the surge boxes with line 134 handling overflow from both the wash liquid surge boxes WL and wash water surge boxes WW. Vacuum line 136 draws liquid through the collection lines 138 and separator 140 for each filter cell 125. Vacuum line 136 is controlled by valve 137. The various filtrates from each filter cell 125 are removed through a filtrate pump 141, a header 142, see FIGURE 5, and filtrate removal lines 144 including a filtrate valve 146 in each line 144. Filtrate removal valves 146 operate in response to a programmer as described with respect to filtrate valves 68, etc., in FIGURES 1 and 3. Air supply line 148 provides pressurized air to filter cells 125 through bleed line 150 and air bleed valve 152 and through blow line 154 and air blow valve 156, see FIGURE 5. A programmer controls operation of the filter cells 125 as described with respect to cell 25. As shown best in FIGURE 4, each pair of adjacent filter cells 125 is arranged in a funnel casing 158. When a filter cell 125 is rotated to remove filter cake, the cake is dumped into casing 158 and removed through conduit 160 by a conveyor belt, screw conveyor, etc., not shown.

It is claimed:

1. A filter system for filtration of a slurry and washing of the filter cake comprising a tilting filter cell unit including a filter pan means and means for pivoting the pan about a horizontal axis, separate surge boxes for holding a quantity of said slurry and at least one wash liquid supported above said filter pan, means for supply said slurry and wash liquid to their respective surge boxes, separate charge valve means controlling the discharge of a quantity of slurry and wash liquids from said surge boxes onto said filter pan, filtrate separator means, vacuum producing means connected to said filtrate separator means including vacuum control valve means for controlling the application of the vacuum, collector pipe means connected to said separator means and said filter cell unit for removing filtrate from beneath said filter pan, filtrate header means connected to said separator means, the vacuum from said vacuum producing means drawing filtrate from said filter pan to said separator means through said collection pipe means wherein the filtrate is separated for passage into said header means, filtrate discharge means including separate filtrate valve means for discharging filtrate from said slurry and wash liquid from said header means, pump means intermediate the separator means and the filtrate header means and programmer means for automatically and independently operating said charge valve means, said pump means, said filtrate valves, said vacuum control valve means and said means for pivoting the filter pan in a predetermined program of continuous filtration.

2. The filter system defined in claim 1 further including air supply means including air conduit means connected to said collector pipe means at the end thereof opposite said vacuum producing means and automatically operated air valve means in said air conduit means operatively connected to said programmer means.

3. The filter system defined in claim 1 further including a plurality of tilting filter cell units each including a filter pan means and means for pivoting the pan about a horizontal axis, separate surge boxes for holding a quantity of the slurry and at least one wash liquid supported above the filter pan, means for supplying slurry and wash liquid to their respective surge boxes, separate charge valve means controlling the discharge of a quantity of slurry and wash liquids from surge boxes onto the filter pan, filtrate separator means, collector pipe means connected for removing filtrate from beneath said filter pan, filtrate header means connected to the separator means, a single pump means intermediate said filtrate separator means and said filtrate header means, filtrate discharge means including separate filtrate valve means for discharging filtrate from said slurry and wash liquid from the header means; and wherein the vacuum producing means is connected to the filtrate separator means for each said filter cell unit and the programmer means automatically and independently operates for each individual filter cell unit each charge valve means, each filtrate valve, the pump means and each means for pivoting the filter pan in a predetermined program of conduit filtration for each filter cell unit.

4. The filter system defined in claim 1 further including distributor trough means arranged to receive the slurry and wash liquid discharged onto the filter pan from the respective surge boxes and to distribute the same across the filter pan means.

5. The filter system defined in claim 4 wherein the distributor trough means is a V-shaped trough with slotted openings adjacent the apex of the closed V, and further including means at the slotted openings to prevent direct impingement of liquid upon the filter pan means.

6. The filter system defined in claim 1 further including a power source, and wherein said means for supplying slurry and wash liquid continuously supplies slurry and wash liquid to their respective surge boxes, and said programmer means includes means individually connecting said power source to said means for pivoting the filter pan, said charge valve means, said pump means, said filtrate valve means and said vacuum control valve means to perform the following sequence of operations: Opening of the slurry charge valve means on said slurry surge box to dump slurry on said filter cell, opening of the vacuum control valve means to apply a pressure differential across said filter pan, opening of the pump means and slurry filtrate valve means, closure of said slurry charge valve means and opening of the wash liquid charge valve means, closure of said slurry filtrate valve means and opening of the wash liquid filtrate valve means, closure of said vacuum control valve means, said pump means and said wash liquid charge valve means, and pivoting of said filter pan.

7. The filter system defined in claim 6 further including air supply means including air conduit means connected to said collector pipe means at the end thereof opposite the vacuum producing means and automatically operated air valve means in said air conduit means operatively connected to said programmer means.

8. The filter system defined in claim 7 wherein said air valve means is a blow valve supplying air to said filter cell to remove the filter cake upon pivoting of said cell.

9. The filter system defined in claim 8 wherein said air supply means includes second air conduit means and an air bleed valve means in said second conduit means supplying air to said collector pipe means while said filtrate removal valves are open.

10. The filter system defined in claim 8 further including distributor trough means arranged to receive the slurry and wash liquid discharged onto the filter pan from the respective surge boxes and to distribute the same across the filter pan means.

References Cited

UNITED STATES PATENTS 3,397,787   8/1968   Mini _____ 210—142 X

REUBEN FRIEDMAN, Primary Examiner

F. A. SPEAR, JR., Assistant Examiner

U.S. Cl. X.R.

210—142, 143, 241, 328, 333, 408, 410, 456